Oct. 30, 1962 R. R. SMYTH 3,061,769
ELECTRIC WAVE CONVERTER
Filed April 14, 1960 3 Sheets-Sheet 1

INVENTOR.
ROBERT R. SMYTH
BY
ATTORNEY

United States Patent Office 3,061,769
Patented Oct. 30, 1962

3,061,769
ELECTRIC WAVE CONVERTER
Robert R. Smyth, Lincoln, Mass., assignor to Technical Operations, Incorporated, Burlington, Mass., a corporation of Delaware
Filed Apr. 14, 1960, Ser. No. 22,307
7 Claims. (Cl. 321—16)

This invention relates generally to circuits for converting electric wave energy from one wave form to another, and more particularly to circuits which are capable of deriving a substantially sinusoidal wave exclusively from the energy content of a rectangular wave.

Direct current to alternating current converters exist in which the output is a square wave. A well-known example is the vibrator-driven switch which has been used for many years to supply alternating current from a low-voltage storage battery for transformation to a higher voltage and subsequent rectification to supply a higher voltage direct current for use in a radio receiver. More recently there has been developed the solid state or transistorized direct current to alternating current converter, in which the output is almost invariably a square wave. Heretofore, the use of such converters has been limited to situations in which their square wave output is acceptable, as for rectification, as mentioned above. More widespread use of D.C. to A.C. converters has awaited the development of a converter capable of supplying a sine wave output, and the opportunities for use of such a converter have increased markedly with the introduction of transistorized converters.

A square wave can be mathematically demonstrated to consist of a fundamental sine wave of the same frequency as the square wave, and various proportions of odd-harmonics of the fundamental frequency, also sinusoidal. The amount of third harmonic in a square wave is approximately one-third in amplitude of the fundamental sine wave. The fifth, seventh and ninth odd harmonics are considerably smaller in amplitude than the third harmonic, being, respectively, approximately one-fith, one-seventh, and one-ninth in amplitude of the fundamental sine wave, and so forth to the still higher order odd harmonics. The even harmonics have theoretically zero magnitudes and practically have insignificant magnitudes. The vast bulk of apparatus and devices which are operable with alternating current require sinusoidal power of a given frequency, and may be damaged, or may not operate properly, when supplied with power at another significantly different frequency; the presence of substantial quantities of energy at harmonics of the desired frequency is thus undesirable. On th other hand, it is known that transistors operate most efficiently as oscillators in the switching, or rectangular wave mode, and produce rectangular, rather than sinusoidal output waves.

It is the general object of this invention to provide a D.C. to sine wave converter which will extend the use of D.C. to A.C. converters to electrical apparatus and devices requiring a sinusoidal input. To this end, the invention contemplates a rectangular wave to sine wave converter which will not require the provision of an additional source of power to supply any part of the energy content of its output sine wave, recognizing that the requirement for an additional power source would tend to inhibit the extension of use of D.C. to A.C. converters. It is accordingly a further object of the invention to provide a rectangular wave to sine wave converter which is capable of deriving a substantially harmonic-free sinusoidal wave exclusively from the energy content of the rectangular wave. Another object of the invention is to provide such a converter which includes voltage transformation capabilities. Additional objects of the invention are to provide such a rectangular-to-sine wave converter in which protective features, such as constant output voltage over a prescribed load impedance range and short-circuit protection, are inherent or can be readily incorporated. It is another object to provide the foregoing features in a converter which is constructed of components which are essentially nondissipative, rugged, readily available, light weight and low in cost, so that there will be no unusual environmental, material or cost restrictions on the use of the invention.

The basic objects of the invention are realized in a resonant circuit comprising an inductive component and a capacitive component having substantially equal reactances at the fundamental frequency of the input rectangular wave, in combination with input means inductively coupling a source of alternating rectangular wave energy to the inductive component, and a sine wave output circuit also coupled to the inductive component. Preferably the input circuit is loosely coupled to the resonant circuit, as by the provision of a partial magnetic shunt for the input circuit inductive path. Voltage regulation of the output sine wave can be provided in a manner known to the art of voltage regulating transformers. Converters built according to the foregoing principles have yielded a sine wave output having less than 3 percent third harmonic content from an input rectangular wave having 37 percent third harmonic content, as compared with fundamental=100 percent, and have reduced the higher-order odd harmonic components of the input rectangular wave by approximately the same orders of magnitude. It has been found that the odd harmonic content of the output sine wave energy is practically the same when sinusoidal input wave energy at the same fundamental frequency as the rectangular wave energy is substituted for the rectangular input wave energy, which is a startling and completely unexpected result.

Other and further objects and features of the invention will become apparent from the following description of certain embodiments. This description refers to the accompanying drawings, wherein.

Figure 1:
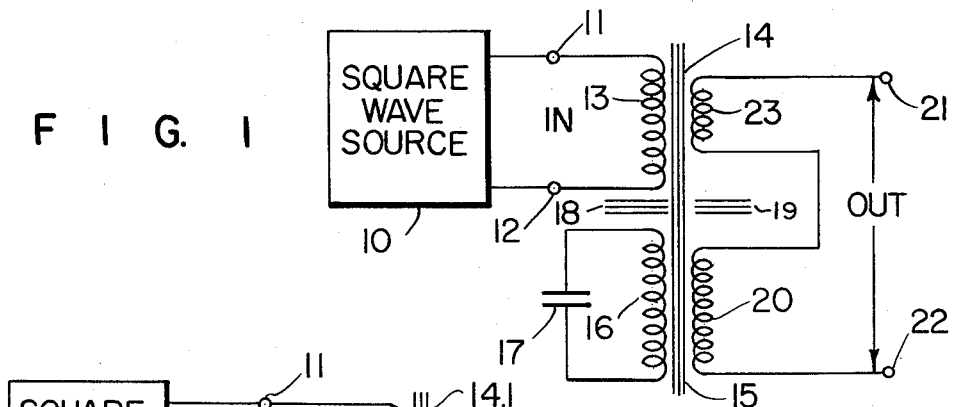
FIGS. 1 and 2 illustrate, respectively, two different embodiments of the invention.

Referring to FIG. 1, a square wave source 10 is connected via input terminals 11 and 12 to the primary winding 13 of a transformer 14 which is generally of the voltage regulating type. The transformer has a core 15, of a usual transformer iron or steel, on which is wound the inductor 16 of a resonant circuit which includes a capacitor 17. The primary winding 13 and the inductor 16 are located on separate parts of the core 15 and a partial magnetic shunt for the primary winding is provided by core pieces 18 and 19, located between these two windings, so that the coupling between them is loose. The magnitudes of the inductor 16 and the capacitor 17 are selected to provide that these elements have susbtantially euqal reactances at the fundamental sine wave frequency of the square wave from the source 10. An output winding 20 is tightly coupled to the inductor 16 and, as will be explained more specifically below, a nearly harmonic-free since wave voltage at the fundamental frequency of the source 10 appears across the output terminals 21 and 22 of the output winding when a square wave from the source 10 is applied across the input terminals 11 and 12. A compensating winding 23 is wound on the core 15 tightly coupled to the primary winding 13, and is connected in series with the output winding 20 in the sense to regulate the output voltage.

The transformer 14 and windings thereon, together with the condenser 17 and partial shunt magnetic paths represented by the core pieces 18 and 19, will be recognized as equivalent to the constant potential transformer of U.S. Patent No. 2,143,745, issued January 10, 1939, to J. G. Sola. As is explained in that patent, this transformer is designed and intended to provide a voltage regulated alternating current sine wave output from a fluctuating alternating current sine wave input. This transformer was not designed for use with an input voltage which is rich in harmonics of the fundamental sine wave and, indeed, in an improvement Patent No. 2,694,177 issued November 9, 1954, to J. G. Sola, it is stated that under certain conditions the voltage output of the transformer according to Patent No. 2,143,745 has included as much as 5 percent of third harmonic. The improvement patent introduces a harmonic neutralizing winding in order to reduce the quantity of third and other harmonic components present in the output of such constant voltage transformers when operated from a sine wave generator. The present invention results from my startling and completely unexpected discovery that the combination of such a constant voltage transformer with a source of rectangular or square wave alternating voltage input will yield a sine wave alternating voltage output which is as free as, in some cases more free of, third harmonic and other odd harmonic components that the same transformer when operated with a sinusoidal input, and this is essentially true whether or not a harmonic neutralizing winding according to Patent No. 2,694,177 is employed.

Figure 2:
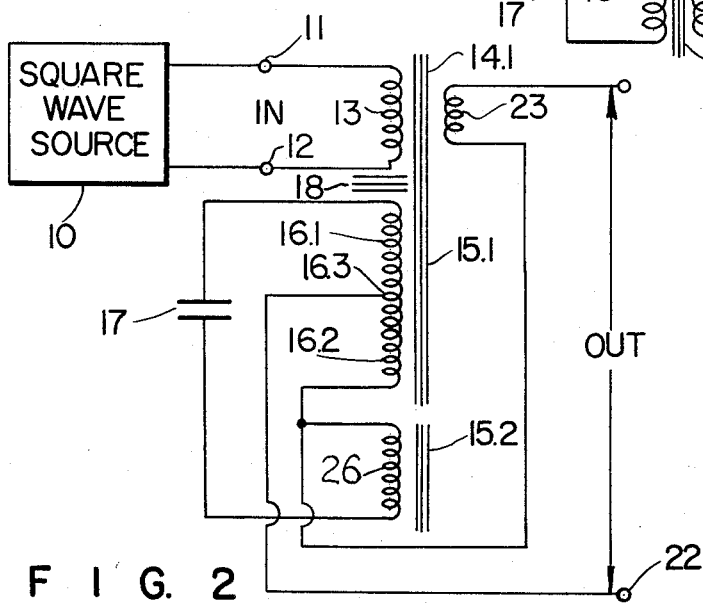

In FIG. 2 the square wave source 10 is shown in combination with a constant potential transformer 14.1, having some parts similar to parts of the transformer 14 of FIG. 1 and bearing like reference characters, and including a harmonic neutralizing winding 26. The core of this transformer 14.1 is in two parts 15.1 and 15.2. The inductor winding is composed of two coils 16.1 and 16.2 wound in series on the first core part 15.1, and the primary winding 13 is wound on the same core part with the partial magnetic shunt 18 between them. One part 16.2 of the inductor, defined by the tap 16.3, serves as the output winding, in series with the compensating winding 23. The harmonic neutralizing winding 26 is disposed on the second core part 15.2 and is connected across the entire inductor 16.1 and 16.2 in series with capacitor 17.

Figure 3:
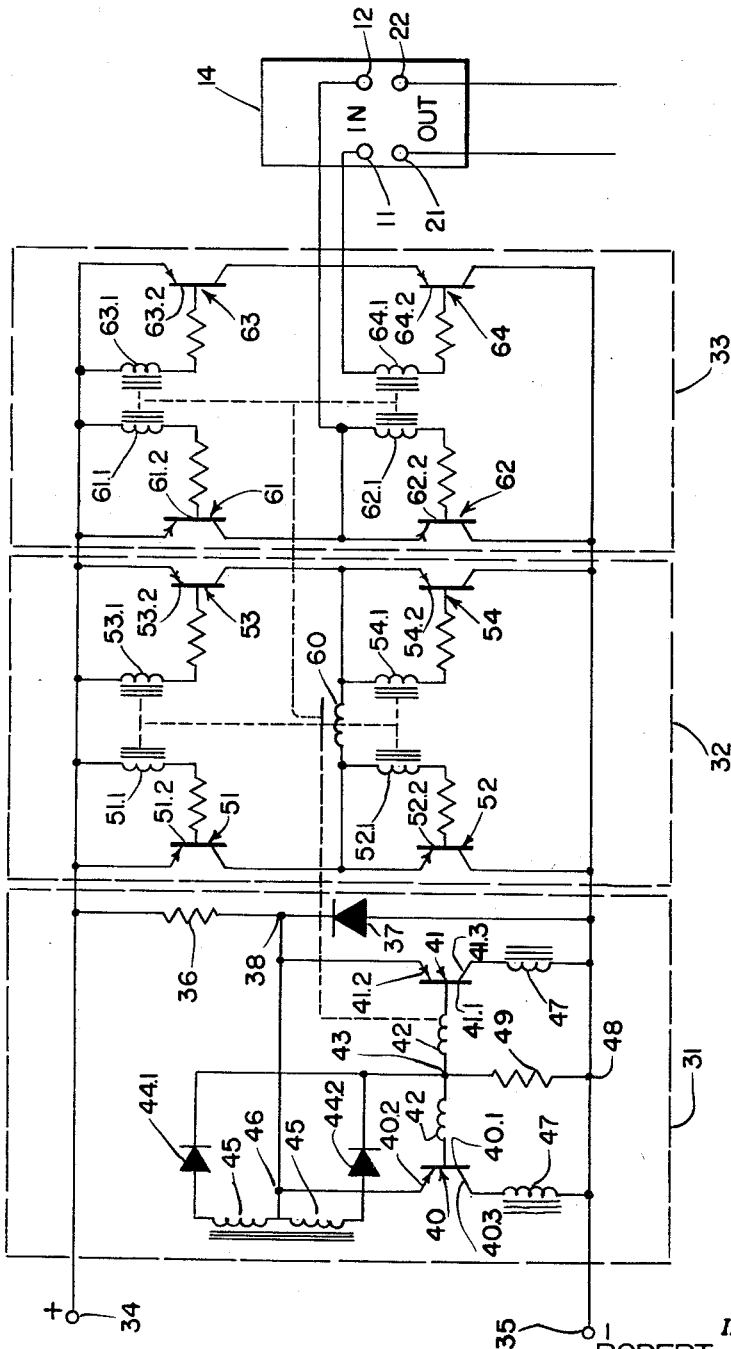
FIG. 3 is a circuit diagram of a transistor square wave oscillator with driver and power amplifiers.

The square wave source 10 may be constructed as is shown in FIG. 3, where the three dotted-line boxes 31, 32, and 33 enclose, respectively, a transistor oscillator, a driver amplifier and a power amplifier. Direct current is applied across the positive terminal 34 and the negative terminal 35. A resistor 36 and a voltage-reference diode 37, shown in the oscillator box 31, are connected in series across these terminals, and a constant positive D.C. voltage is supplied, between their junction 38 and the negative terminal 35, for the oscillator circuit. The oscillator circuit itself comprises two transistors 40 and 41, of which the bases 40.1 and 41.1 are connected to respective ends of a first transformer primary winding 42 which is center-tapped at 43. Bias diodes 44.1 and 44.2 are connected at like sides to the respective ends of a secondary winding 45 on the first transformer, which secondary winding is center-tapped at 46. The emitters 40.2 and 41.2 of the transistors are connected together to this latter center tap 46, and the remaining sides of the bias diodes 44.1 and 44.2 are connected together to the center tap 43 of the primary winding 42. The center tap 46 is connected to the junction 38 of the resistor 36 and the voltage-reference diode 37. The collectors 40.3 and 41.3 of the transistors are connected to respective ends of another secondary winding 47 of the first transformer, and a center tap 48 on this winding is connected via a resistor 49 to the center tap 43 of the primary winding 42, and directly to the negative D.C. supply terminal 35. The transistor oscillator of box 31 is a known form of transistor oscillator, which converts (i.e., "chops") direct current into square wave alternating current.

The driver amplifier in box 32 is also of a known form, here employing four transistors 51, 52, 53 and 54. The transistors are connected across the D.C. supply terminals 34 and 35 in series pairs 51, 52 and 53, 54 and driven through their respective bases 51.2, 52.2, 53.2 and 54.2 via secondary windings 51.1, 52.1, 53.1 and 54.1, respectively, of the first, or oscillator transformer. Two of these secondary windings 51.1 and 53.1 are connected at a common junction to the positive terminal 34, and constitute in effect a single center-tapped secondary winding. The remaining two of these secondary windings 52.1 and 54.1 are connected in series with the primary winding 60 of a second or driver output transformer between them.

The power amplifier in box 33 is similar to the driver amplifier, and employs four transistors 61, 62, 63 and 64 in a similar circuit. A center-tapped secondary winding on the driver output transformer comprising two parts 61.1 and 63.1 connected at their common junction to the positive D.C. supply terminal 34 drives two of the transistors 61 and 63, respectively, via their respective bases, 61.2 and 63.2. Two additional secondary windings 62.1 and 64.1 on the driver output transformer drive, respectively, the remaining transistors 62 and 64, and are connected in series with the input terminals 11 and 12 of, for example, the transformer 14 of FIG. 1 between them, to supply to the latter the amplified alternating square wave output of the oscillator in box 31. Obviously, the transformer 14.1 of FIG. 2 may be substituted for the transformer 14 in FIG. 3.

It will be appreciated that the showing of FIG. 3 is by way of example only, and is not intended to limit the scope of the invention.

A one-kilowatt constant voltage transformer as shown in FIG. 2 was driven with sinusoidal alternating current applied to the input terminals 11 and 12 at voltages ranging from 95 volts to 127 volts, with a resistive load of approximately 1 kilowatt, provided by five, two-hundred watt incandescent lamps in parallel, with the results given in Table I as follows:

*Table I*

| $V_{IN}$, v. | $I_{IN}$, a. | $V_{OUT}$, v. | $I_{OUT}$, a. |
| --- | --- | --- | --- |
| 95  | 11.6 | 115.9 | 8.2 |
| 100 | 11.1 | 116.3 | 8.2 |
| 105 | 10.6 | 116.7 | 8.2 |
| 110 | 10.2 | 116.9 | 8.2 |
| 115 | 9.9  | 117.1 | 8.2 |
| 120 | 9.7  | 117.0 | 8.2 |
| 125 | 9.6  | 116.9 | 8.2 |
| 127 | 9.7  | 116.9 | 8.2 |

Figure 4:
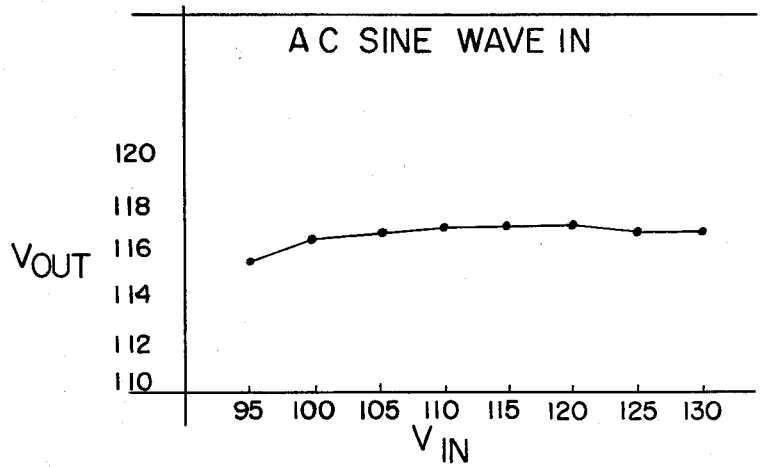
FIG. 4 is a graph of sine wave output voltage versus sine wave input voltage, for a voltage regulated converter according to FIG. 2 employing a sinusoidal input voltage.

The output voltage ($V_{OUT}$) is plotted against the input voltage ($V_{IN}$), in FIG. 4. The same transformer, with the same load, was driven, via a transistor oscillator and amplifiers as shown in FIG. 3, with square wave alternating current at voltages varying between 95 volts and 130 volts applied to the input terminals 11 and 12, with the results given in Table II as follows:

Table II

| $V_{IN}$, D.C., v. | $I_{IN}$, D.C., a. | $V_{IN}$, A.C. Square Wave, a. | $V_{OUT}$, v. | $I_{OUT}$, a. |
|---|---|---|---|---|
| 98  | 11.5 | 95  | 113.8 | 8.1 |
| 103 | 11.2 | 100 | 115.0 | 8.1 |
| 109 | 10.6 | 105 | 116.5 | 8.15 |
| 113 | 10.3 | 110 | 117.4 | 8.2 |
| 118 | 10.2 | 115 | 118.2 | 8.2 |
| 123 | 9.8  | 120 | 118.0 | 8.2 |
| 128 | 9.8  | 125 | 119.4 | 8.2 |
| 133 | 10   | 130 | 118.4 | 8.2 |

Figure 5:
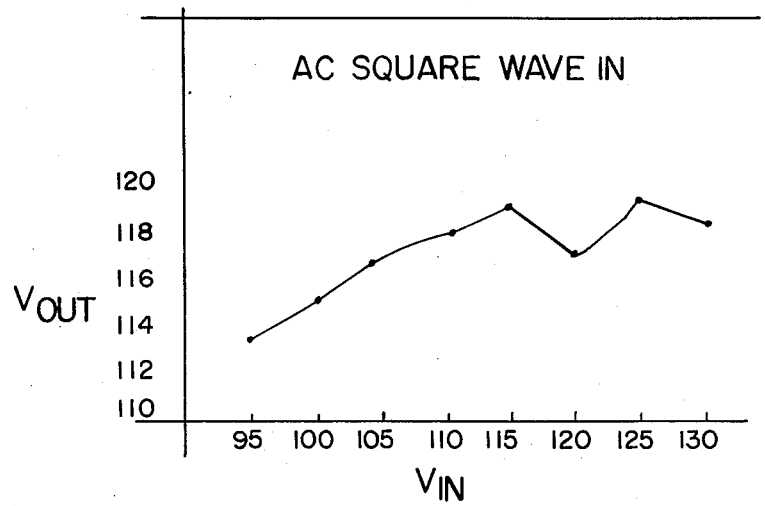
FIG. 5 is a graph of sine wave output voltage versus square wave input voltage, for a voltage regulated converter according to FIG. 2 employing a square wave input voltage.

Table II shows the input D.C. voltage and current supplied to the transistor oscillator, and the square wave voltage derived from the power amplifier, as the input data for the constant voltage transformer. The sine wave output voltage ($V_{OUT}$) is plotted against the alternating square wave input voltage ($V_{A.C.\ Square\ Wave}$) in FIG. 5. These data, and similarly obtained data for a one-kilowatt constant voltage transformer as shown in FIG. 1, indicate that the voltage regulating property of such constant voltage transformers designed for operation with harmonic-free sinusoidal input voltage is not substantially adversely affected by driving them with alternating square wave voltage.

Data were taken under similar load conditions but separately on two different one-kilowatt transformers, one not harmonic neutralized (as shown in FIG. 1), and the other harmonic neutralized (as shown in FIG. 2), concerning the percentage distortion of the output wave in each case, when driven with square wave input voltage and when driven with sine wave input voltage. These data are set forth in Table III as follows:

Table III

| Harmonic | Frequency | Percent Distortion in Output | | | | Square Wave Harmonic Content |
|---|---|---|---|---|---|---|
| | | Not Neutralized | | Harmonic Neutralized | | |
| | | Square Wave Input | A.C. Sine Wave Input | Square Wave Input | A.C. Sine Wave Input | |
| | 60   | 100.00 | 100.00 | 100.00 | 100.00 | 100.00 |
| 2nd  | 120  | 3.0   | .05   | .58   | .03   | 1.2  |
| 3rd  | 180  | 15.5  | 14.00 | 2.7   | 1.9   | 37.0 |
| 4th  | 240  | 1.3   | .04   | .05   | .02   | 1.1  |
| 5th  | 300  | 3.0   | 5.30  | 2.7   | 1.2   | 22.0 |
| 6th  | 360  | 0.4   | .04   | .12   | .01   | 1.3  |
| 7th  | 420  | 3.0   | 2.00  | 1.3   | .68   | 15.0 |
| 8th  | 480  | 0.1   | .04   | .11   |       | 1.0  |
| 9th  | 540  | 1.8   | .57   | 1.0   | .38   | 12.0 |
| 10th | 600  | 0.1   | .04   | .04   |       | 1.0  |
| 11th | 660  | 1.5   | .15   | .56   | .36   | 9.5  |
| 12th | 720  | 0.1   | .04   | .08   |       | 1.1  |
| 13th | 780  | 1.2   | .22   | .36   | .12   | 8.0  |
| 14th | 840  | 0.11  | .04   | .07   |       | 0.84 |
| 15th | 900  | 1.1   | .20   | .26   | .09   | 7.0  |
| 16th | 960  | 0.1   | .04   | .04   |       | 1.0  |
| 17th | 1,020 | 1.0  | .14   | .26   | .05   | 6.2  |

As is indicated in the last column of Table III, the odd-harmonic content of a representative square wave, referred to the fundamental as 100 percent, is approximately 37 percent third harmonic, 22 percent fifth harmonic, 15 percent seventh harmonic, 12 percent ninth harmonic, etc. Considering each odd harmonic shown in Table III, it is seen that the percentage distortion in the output of each transformer, whether harmonic neutralized or not, is substantially the same in each case whether the input voltage is a sine wave or a square wave. For example, in the case of a not-neutralized transformer (e.g., as shown in FIG. 1), the output third harmonic distortion was 14 percent (referred to the fundamental as 100 percent) for a sinusoidal input voltage, as compared with 15 percent for a square wave input voltage, notwithstanding that the third harmonic content of the input square wave was 37 percent measured against the fundamental as 100 percent. Similarly, for the harmonic neutralized transformer (e.g., as shown in FIG. 2) the third harmonic distortion in the output was 1.9 percent for sinusoidal input voltage and 2.7 percent for the square wave input voltage.

This is a reduction of the third harmonic content to less than 10 percent of the third harmonic content of the input for the harmonic neutralized case, and to less than half for the not-harmonic neutralized case. The other odd harmonic components are even more drastically reduced in amplitude (compared with the fundamental) as is shown clearly in Table III. More important, these data demonstrate that the odd harmonic content of the output sine wave energy is, in each case, practically the same when a rectangular wave input voltage is substituted for the sinusoidal input voltage for which the respective transformer was designed.

Thus, while it is characteristic of the voltage regulating transformers herein referred to that they appear to generate and contribute distortion of their own to a sinusoidal input, they severely attenuate the odd harmonic content of an input square wave, reducing each of the odd harmonics in the output to a fraction, sometimes a very minor fraction, of its original value in the input. The result is that the output from an input square wave is a sine wave of substantially the same harmonic distortion content as is yielded from an input sine wave, and this appears to be true whether or not harmonic neutralizing measures have been taken in the design of the transformer. This reduction of the odd harmonic content of an input rectangular wave voltage is a startling and unexpected discovery, and I know of no explanation for it. While the performance of a constant voltage transformer driven with a sine wave input can be explained with the aid of vector diagrams, vector diagrams have little or no meaning with respect to rectangular waves, for they would apply only to the fundamental.

I have discovered that a constant voltage transformer of the type referred to herein, which is designed for operation with input sine wave voltage, has the following properties when operated with an input square wave voltage of the same fundamental frequency as the design sine wave input:

(1) It retains its constant voltage, or voltage regulating property; and (2) It retains its short-circuit stability; and (3) It reduces the input distortion to approximately the same level in the output that would be had if the design input sine wave were used; and (4) It does not impose any requirement on the square wave source beyond the present state of the art.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. In combination, a source of alternating rectangular wave voltage, a resonant circuit comprising an inductive component and a capacitive component having substantially equal reactances at the fundamental frequency of said rectangular wave, input circuit means inductively coupling said source to said inductive component, the input inductive coupling path being partially shunted by magnetic path means, and a sine wave output circuit inductively coupled to said inductive component.

2. In combination, a source of alternating rectangular wave voltage at a prescribed fundamental frequency and having a third harmonic component the amplitude of which is of the order of one-third of the amplitude of the fundamental component, a resonant circuit comprising an inductive component and a capacitive component having substantially equal reactances to sine wave energy at said fundamental frequency, input circuit means inductively coupling said source to said inductive component, the input inductive coupling path being partially shunted by magnetic path means, and an output circuit inductively coupled to said inductive component, said output circuit supplying an output sinusoidal voltage at said fundamental frequency having a third harmonic component the amplitude of which is between approximately 15 percent and 3 percent of the fundamental component of said output voltage.

3. In combination, a source of alternating rectangular wave voltage the amplitude of which is variable between prescribed upper and lower limits, a resonant circuit comprising an inductive component and a capacitive component having substantially equal reactances at the fundamental frequency of said rectangular wave, input circuit means inductively coupling said source to said inductive component, and a sine wave output circuit inductively coupled to said inductive component, the input inductive coupling path being partially shunted by magnetic path means.

4. In combination, a source of alternating square wave voltage, a resonant circuit comprising an inductive component and a capacitive component having substantially equal reactances at the fundamental frequency of said square wave, input circuit means inductively coupling said source to said inductive component, the input inductive coupling path being partially shunted by magnetic path means, and a sine wave output circuit inductively coupled to said inductive component, the output voltage of said output circuit being a sine wave having odd harmonic components the amplitudes of which are of the order of one-half to one-tenth the respective amplitudes of the corresponding odd harmonic components of the input square wave.

5. In combination, a source of alternating rectangular wave voltage, a constant voltage transformer of the type intended for operation with an input sine wave voltage in a given frequency range and characterized by a resonant circuit having an inductive component and a capacitive component, said components having substantially equal reactances at the fundamental frequency of such input sine wave voltage, said rectangular wave voltage having a fundamental frequency within said range, input circuit means inductively coupling said source to said inductive component, the input inductive coupling path being partially shunted by magnetic path means, and a sine wave output circuit inductively coupled to said inductive component.

6. In combination, means to derive an alternating current of rectangular wave form, and having a given fundamental frequency, entirely from the energy content of a unidirectional current, said means having output terminal means at which said alternating rectangular wave current is available in a given range of voltages, a constant voltage transformer of a type intended for operation with an input sine wave voltage at said fundamental frequency and characterized by a resonant circuit having a capacitive component and an inductive component, said components having substantially equal reactances to sine waves at said fundamental frequency, input circuit means inductively coupling said output terminal means to said inductive component, the input inductive coupling path being partially shunted by magnetic path means, and a sine wave output circuit inductively coupled to said inductive component.

7. In combination, means to derive an alternating current of rectangular wave form entirely from the energy content of a unidirectional current, said means having output terminal means at which said alternating rectangular wave current is available, a resonant circuit comprising an inductive component and a capacitive component having substantially equal reactances at the fundamental frequency of said rectangular wave, input circuit means inductively coupling said output terminal means to said inductive component, the input inductive coupling path being partially shunted by magnetic path means, and a sine wave output circuit inductively coupled to said inductive component.

References Cited in the file of this patent

UNITED STATES PATENTS

| | | |
|---|---|---|
| 2,143,745 | Sola | Jan. 10, 1939 |
| 2,748,278 | Smith | May 29, 1956 |
| 2,804,588 | Hjermstad | Aug. 27, 1957 |
| 2,862,170 | Hjermstad | Nov. 25, 1958 |
| 2,987,665 | Thompson | June 6, 1961 |

OTHER REFERENCES

Standard Handbook for Electrical Engineers, published by McGraw-Hill Book Company (1933), 6th edition, page 62 relied on.

Constant Voltage Transformers by Sola, published by Sola Electric Company, Bulletin CV-74, 3rd edition.